United States Patent
Lee et al.

(10) Patent No.: US 6,179,637 B1
(45) Date of Patent: Jan. 30, 2001

(54) ASSEMBLY AND METHOD FOR AUTOMATICALLY PROVIDING SECONDARY CONNECTIONS FOR SWITCHGEAR

(75) Inventors: Gregory Brent Lee; Larry Gene Ratliff, both of Middletown, OH (US)

(73) Assignee: Square D Company, Palatine, IL (US)

(*) Notice: Under 35 U.S.C. 154(b), the term of this patent shall be extended for 0 days.

(21) Appl. No.: 08/963,956

(22) Filed: Nov. 4, 1997

(51) Int. Cl.⁷ .................................................. H01R 13/64
(52) U.S. Cl. ............................................ 439/248; 439/378
(58) Field of Search .................................... 439/247, 248, 439/378; 361/605–621, 337, 343; 200/47, 50 AA

(56) References Cited

U.S. PATENT DOCUMENTS

| | | | |
|---|---|---|---|
| 4,139,748 | * 2/1979 | Wolfe et al. | 200/50 AA |
| 4,236,189 | * 11/1980 | Yoshida | 361/337 |
| 4,395,602 | * 7/1983 | Castonquay | 200/50 AA |
| 4,647,130 | * 3/1987 | Blair et al. | 439/248 |
| 4,761,521 | * 8/1988 | Beck et al. | 2000/50 AA |
| 5,622,511 | * 4/1997 | Jarrett | 439/248 |

* cited by examiner

Primary Examiner—Lincoln Donovan

(74) Attorney, Agent, or Firm—Kareem M. Irfan; Larry I. Golden

(57) ABSTRACT

An assembly for auotomatically mating a plug terminal attached to the exterior of a circuit breaker with a receptacle terminal attached to the interior of a switchgear cell to provide secondary connections therebetween. The assembly includes a plug having a generally planar body partially defined by a surface and opposing surface. A plug terminal is supported by the opposing surface of the plug. A mounting bracket is slidably affixed to the opposing surface of the plug. The bracket has an aperture to allow the plug terminal to extend therethrough. The bracket is secured in a fixed position to the exterior of the circuit breaker. The position of the plug is automatically adjusted to provide proper alignment between the plug terminal and the receptacle terminal to form an electrical connection between the terminals which can be disengaged. The inventive assembly can also include a receptacle having a generally planar body partially defined by a surface and opposing surface with the above described automatic adjusting with the plug. A method is also provided by the present invention for automatically making secondary connections between a circuit breaker and a switchgear cell by engaging the guide pin of the plug and corresponding surface of the receptacle terminal, automatically sliding the position of the plug terminal relative to the receptacle terminal to provide proper alignment to form an electrical connection between the plug and receptacle terminals which can be disengaged, and mating the guide pin of the plug and corresponding surface of the receptacle terminal in a reversibly affixed connection.

16 Claims, 7 Drawing Sheets

ASSEMBLY AND METHOD FOR AUTOMATICALLY PROVIDING SECONDARY CONNECTIONS FOR SWITCHGEAR

FIELD OF THE INVENTION

This invention relates to the mounting of circuit interrupters into the individual cells of a switchgear or other electrical distribution devices. More particularly, an assembly is provided for automatic and multi-positioned secondary electrical connections between the circuit interrupter and switchgear with an adjustable alignment therebetween.

BACKGROUND OF THE INVENTION

When circuit breakers or other circuit interrupters are mounted in individual cells as drawout switchgear, the primary purpose is to provide a disconnect of the breaker from the line and load bus bars. There are, however, other connections to the breaker, such as for metering and data communication to a power monitoring system which processes and displays information, power to wind-up mechanisms, remote operator controls, wiring to meters from the current transformers and the like. These connections, often several dozen in quantity, must be disconnected when the breaker is removed from the cell and are usually referred to as secondary connections. One requirement of drawout switchgear is a test position in which the line and load connections are broken, but the secondary connections are closed, allowing the breaker to be tested without actual engagement to the main bus bars. Since engagement of the secondary connections is potentially necessary in two different positions, the secondary contacts must allow for the distance between positions. In the past this has been handled by providing sliding secondary contacts. However, they have involved the disadvantages of fragility and maintenance of slide alignments. It is difficult to provide proper alignment for engagement of the secondary connections as the circuit breaker is racked into the cell. Racking the circuit breaker through the test and operating positions in the cell also makes it difficult to maintain reliable electrical connections at each position.

Prior art switchgear often utilized fixed contact elements on the rear panel of the circuit breaker and rear wall of the cell. Misalignment between these two components could result in damage to the equipment and an increased need for customer repair work and maintenance support. The fixed contact elements also reduce the availability of interchanging different individual circuit breakers among the cells in the switchgear since the mounting had to be precise and thus required adjustments for proper mounting.

Another problem has been created by the standards promulgated by certain governmental agencies and municipalities which require that the secondary connections be made automatically. In some instances, equipment existing in the field must be retrofitted or replaced. Meeting these standards should not increase the cost and complexity of manufacturing as well as installing the circuit breaker. Preferably, the automatic secondary connections could be useable for retrofitting equipment already installed in the field.

A need exists for an automatic secondary connection between the circuit breaker and the cell of an electrical distribution device panel. Flexibility in the alignment between the mating pieces of a secondary connection should also be provided for more reliable connections. Preferably, the automatic secondary connection is adaptable to an inexpensive and simple installation method for equipment in the field.

SUMMARY OF THE INVENTION

The present invention provides an assembly for automatically mating a plug terminal attached to the exterior of a circuit breaker with a receptacle terminal attached to the interior of a switchgear cell to provide secondary connections therebetween. The assembly includes a plug having a generally planar body partially defined by a surface and opposing surface. A plug terminal is supported by the opposing surface of the plug. A mounting bracket is slidably affixed to the opposing surface of the plug. The bracket has an aperture to allow the plug terminal to extend therethrough. The bracket is secured in a fixed position to the exterior of the circuit breaker. The assembly includes means for automatically adjusting the position of the plug to provide proper alignment between the plug terminal and the receptacle terminal to form an electrical connection between the terminals which can be disengaged. The adjusting means is connected to the plug and bracket.

The inventive assembly can also include a receptacle having a generally planar body partially defined by a surface and opposing surface. A receptacle terminal is supported by the opposing surface of the receptacle. A cell bracket is slidably affixed to the opposing surface of the receptacle. The cell bracket has an aperture to allow the receptacle terminal to extend therethrough. The cell bracket is secured in a fixed position to the interior of the switchgear cell. The adjusting means can also be connected to the receptacle and cell bracket.

A method is also provided by the present invention for automatically making secondary connections between a circuit breaker and a switchgear cell. The circuit breaker has a plug terminal attached to its exterior and the switchgear cell has a receptacle terminal attached to its interior. The secondary connections are provided between the plug and receptacle terminals. The plug terminal has at least one guide pin and the receptacle terminal has a corresponding surface for affixing to the guide pin thereto. The method includes the steps of: engaging the guide pin of the plug and corresponding surface of the receptacle terminal; automatically sliding the position of the plug terminal relative to the receptacle terminal to provide proper alignment to form an electrical connection between the plug and receptacle terminals which can be disengaged; and mating the guide pin of the plug and corresponding surface of the receptacle terminal in a reversibly affixed connection.

The secondary connectors assembly of the present invention provides the ability to adapt existing switchgear cells and circuit breakers. The adaptation allows the circuit breaker to be interchangeable and increases the reliability of the systems and connections. The present invention removes the need to individually align cell parts and check circuit breakers parts for correct dimensions. Additionally, the present invention is field installable and after being installed does not require a manual connection between the cell and circuit breaker wiring. Connection between the cell wiring and the circuit breaker wiring is completely automatic per the requirements of ANSI C37.20.

The present invention also includes a method for adapting existing communications wiring and interlock protection wiring including the steps of removing the existing connection assembly from a circuit breaker, providing a new breaker connector capable of automatic separable connection to a cell connector, installing the new breaker connection assembly on the circuit breaker, removing the existing receptacle connector from the cell, providing a receptacle connector capable of automatic separable connection to the circuit breaker connector and installing the new cell receptacle assembly.

It is an object of the present invention to provide the ability to automatically connect secondary connections providing a more reliable connection.

Another object of the present invention is to provide the ability to easily and uniformly convert existing switchgear allowing interchangeable use of circuit breakers.

Still another object of the present invention is to provide increased durability and reliability of the secondary connections by providing automatic alignment and connection of the circuit breaker into the cell.

A further object of this invention is to reduce the maintenance costs associated with replacing worn or defective secondary connections by making the connection assemblies more durable.

Another object of the present invention is to provide user-friendly conversion kits to make retrofitting existing switchgear simple and less time consuming.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure but are not to scale.

DETAILED DESCRIPTION OF THE INVENTION

Figure 1:
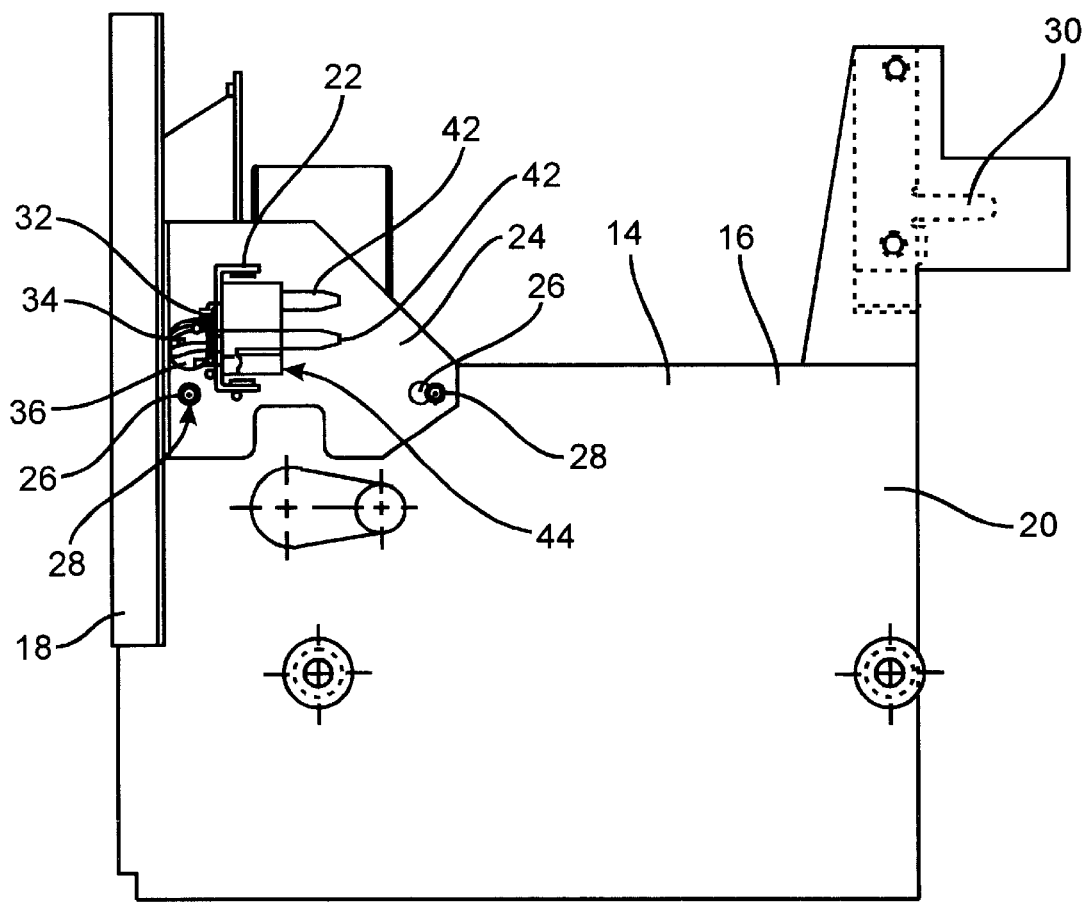
FIG. 1 is a side view of a circuit breaker with a plug of the inventive secondary connections assembly mounted to a side panel.
Figure 2:
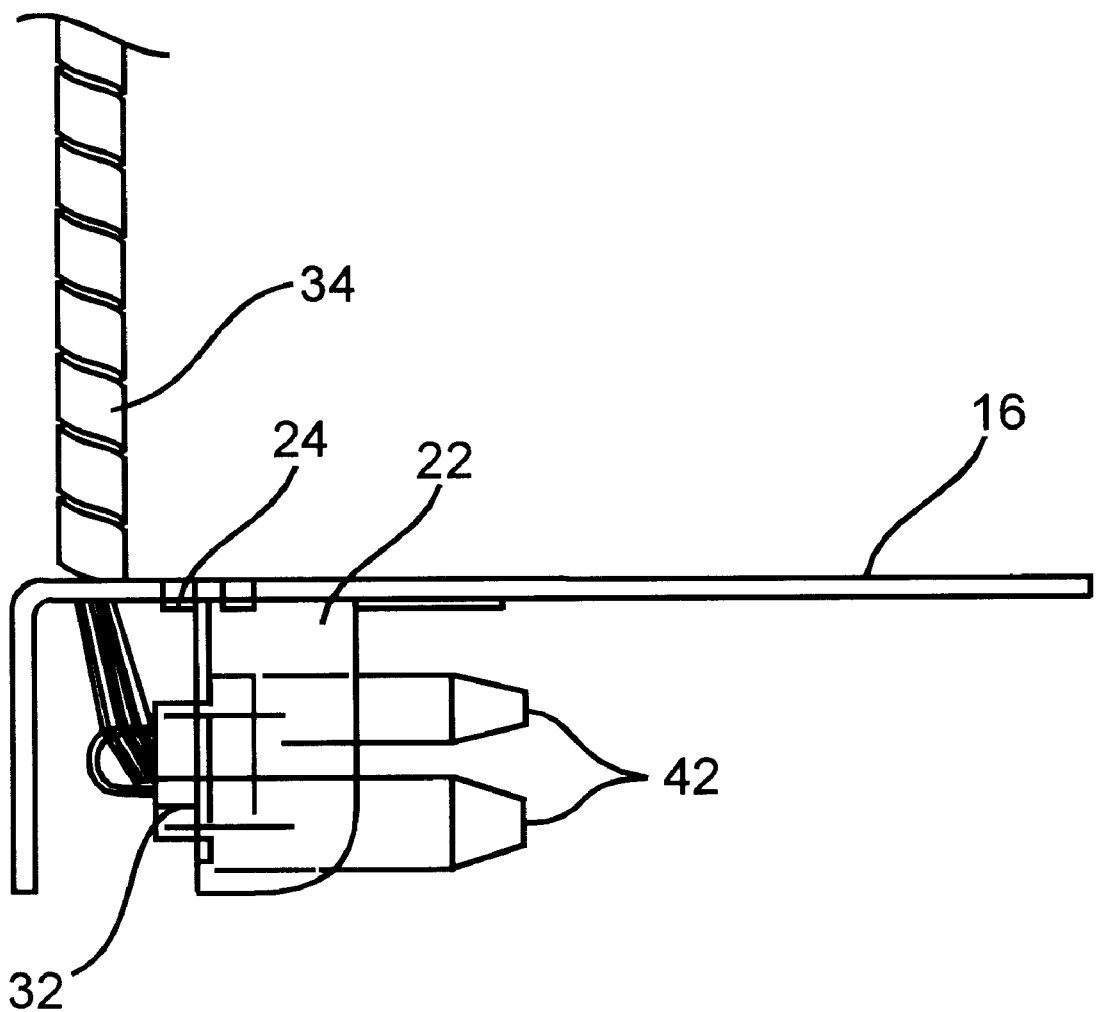
FIG. 2 is a top view of the circuit breaker in FIG. 1 with a plug of the inventive secondary connections assembly mounted to a side panel.

A plug 10 which is one electrical connector component of the inventive secondary connections assembly 12 for a circuit interrupter is illustrated in FIGS. 1 and 2. A circuit breaker 14 is partially defined by a side panel 16 extending between a front panel 18 and a rear panel 20. The plug 10 is mounted on a bracket 22 which extends perpendicularly from and is affixed to a mounting plate 24. The bracket 22 and plate 24 can be formed from one piece of material or can be connected by a fastener, weld, or other attachment means.

The mounting plate 24 is secured to the side panel 16 of the circuit breaker so that the plug 10 extends outward along the exterior of the circuit breaker 14. The mounting plate 24 includes eyelets 26 having a larger diameter section to allow the plate 24 to be placed over the heads of mounting screws 28 which are initially loosened. Subsequently, the plate 24 is moved parallel to the side panel 16 to engage the bodies of the mounting screws 28 in the small diameter portion of the eyelets 26 and the plate 24 under the heads of the mounting screws 28. The mounting screws 28 are then tightened to provide a secure mounting of the plate 24 to the side panel.

Not only is the plug 10 positioned to extend outwardly from the side of the circuit breaker 14, it is also preferably positioned near the front panel 18 of the circuit breaker. The plug 10 is positioned from the front panel 18 along the first half, if not first third, of the length of the circuit breaker 14. One of the advantages of this position is that the initial connection of the plug 10 with the remainder of the assembly 12 is visible before the circuit breaker 14 is fully inserted into the cell. By contrast, a secondary connector 30 of the prior art (shown in phantom in FIG. 1) was usually mounted on the rear panel 20 of the circuit breaker.

The plug 10 is connected to a wire harness 32 which provides a terminal 66 for a plurality of wires 34. The wire harness 32 extends through and is supported by the body of the plug 10 so that the wires 34 enter one surface 38 of the plug 10 and provide the terminal 66 for mating with another electrical connector (not shown) on the opposite surface 40. The wires 34 are routed through a wire hole 36 in the plate 24 to the interior of the circuit breaker 14 to provide metering and data communication to a power monitoring and control system as well as conventional testing and other functions.

The plug 10 includes guide pins 42 that are located on the surface opposite the wire harness 32 and extend perpendicularly therefrom. The guide pins 42 are offset from wire harness 32 and are positioned along its periphery 44. As will be described in greater detail below, the guide pins 42 assist the plug 10 in achieving proper alignment with a corresponding receptacle in a cell. The guide pins 42 include mating ends 65 opposite the ends attached to the surface 40. The mating ends 65 have a conical, tapered shape to assist in the alignment and mating with the corresponding receptacle.

Figure 3:
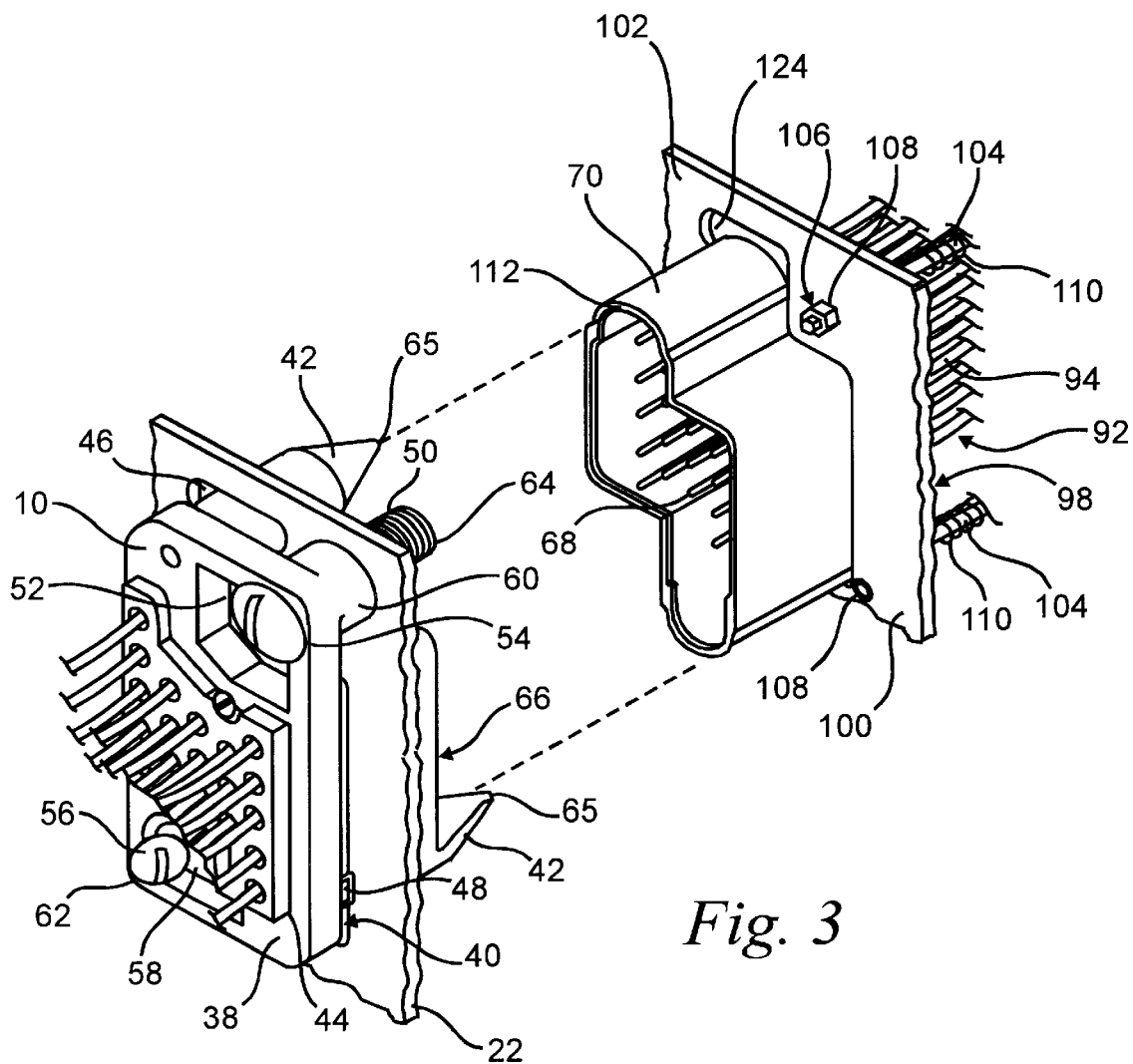
FIG. 3 is an isolated perspective view of the plug and receptacle of the inventive secondary connections assembly.

The alignment flexibility provided by the plug 10 is more specifically illustrated in FIG. 3. The bracket 22 includes at least one slot 46 to allow one of the guide pins 42 to pass through the bracket. Preferably, the bracket 22 has a second slot 48 for accommodating the second of the guide pins 42 through the bracket. The slots 46 and 48 allow the respective guide pins 42 to "float" or adjust their position within the slots. The floating guide pins 42 provide alignment flexibility to engage a corresponding receptacle. The plug 10 is secured to the bracket 22 by at least one shoulder screw 50 which passes through a corresponding connector slot 52 in the plug 10 to secure on the opposite side of the bracket 22 with a fastener 64. The shoulder screw 50 has a head 54 which slidably engages the surface 38 of the plug. Preferably, a second shoulder screw 56 passes through a corresponding second connector slot 58 in a similar fashion. It is also preferred that the two connector slots 52 and 58 are positioned in opposing diagonal corners 60 and 62, respectively, of the plug 10. The sliding engagement between the heads of the shoulder screws 50 and 56 with the surface 38 within the connector slots 52 and 58 of the plug provides a radial floating mount of the plug 10 to the bracket 22. The radial floating mount of the plug 10 allows movement of the guide pins 42 within their respective slots 46 and 48 which, in turn, provides alignment flexibility to engage a corresponding receptacle.

Figure 4:
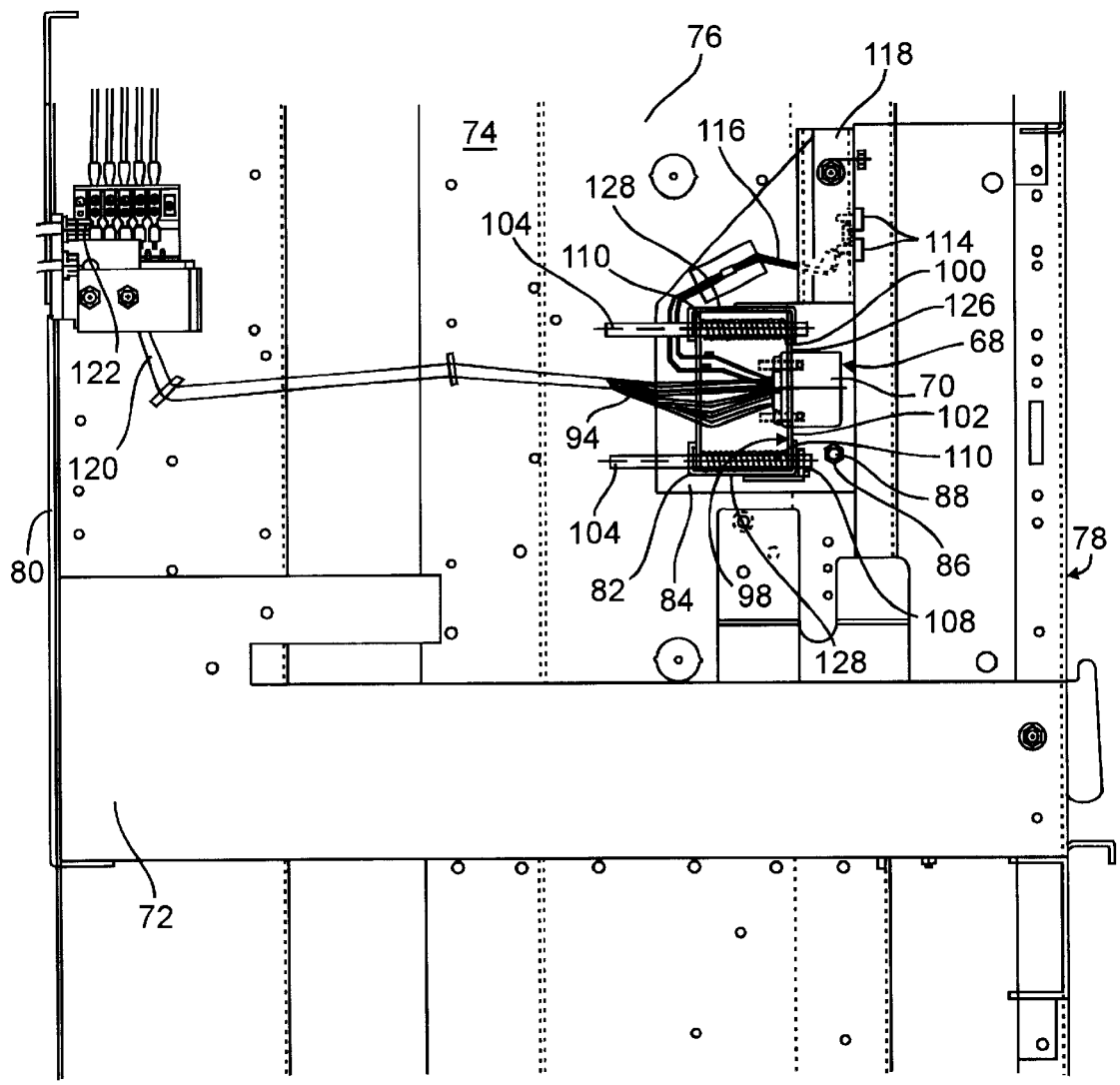
FIG. 4 is side view of a cell in a switchgear with a receptacle of the inventive secondary connections assembly mounted to a side wall.

A receptacle 70 is another component of the inventive secondary connections assembly 12 for a circuit interrupter as illustrated in FIGS. 3 and 4. A cell 74 in a switchgear 72 is adapted to receive the circuit breaker 14 therein. The cell 74 is partially defined by a side wall 76 extending between a front face 78 and a rear wall 80. The receptacle 70 is mounted securely on a base 102 having a body 126 and two elongated legs 128 which is slidably supported by two rods 104 extending through holes 106 in the body 126 and each of the elongated legs 128 of the base. The travel of the base 102 is restricted by the fasteners 108 which terminate one end of each of the rods 104. The rods 104 are stationary by being affixed to a cell bracket 82 which extends perpendicularly from and is affixed to a cell mounting plate 84. The cell bracket 82 and cell plate 84 can be formed from one piece of material or can be connected by a fastener, weld, or other attachment means.

Referring specifically to FIG. 4, the view illustrated is the inner right side of the cell 74 if the observer was facing the front face 78. For the sake of comparison, the view in FIG. 1 illustrates the right side panel 16 of the circuit breaker 14. The cell mounting plate 84 in FIG. 4 is secured to the side wall 76 of the cell so that the receptacle 70 extends inward along the interior of the cell 74. The cell mounting plate 84 includes mounting holes 86 to allow cell mounting screws 88 to pass therethrough and connect to the side wall 76 to provide a secure mounting of the cell plate 84 to the side panel.

Not only is the receptacle 70 positioned to extend outwardly from the side wall 76 of the cell, it is also preferably positioned near the front face 78 of the cell. The receptacle 70 is positioned from the front face 78 along the first half, if not first third, of the length of the interior of the cell 74. One of the advantages of this position is that the initial connection of the receptacle 70 with the plug 10 and the remainder of the assembly 12 is visible before the circuit breaker 14 is fully inserted into the cell 74. By contrast, a receptacle mating to the secondary connector 30 of the prior art (shown in phantom in FIG. 1) was usually mounted on the rear wall 80 of the cell.

Referring again to FIGS. 3 and 4, the receptacle 70 is connected to a cell wire harness 92 which provides a cell terminal 68 for a plurality of cell wires 94. The cell wire harness 92 extends through and is supported by the body of the receptacle 70 so that the cell wires 94 enter one surface 98 of the receptacle 70 and provide a cell terminal 68 for mating with the terminal 66 of the plug 10, previously described, on the opposite surface 100 of the receptacle. The cell wires 94 are routed along the interior side of the side wall 76 and connect to the conventional devices providing metering and data communication to the power monitoring and control system as well as conventional testing and other functions (not shown).

Springs 110 are mounted over the rods 104 and substantially extend the distance between the body 126 of the base and each of the two elongated legs 128. The springs 110 provide a constant positive bias against the surface 100 of the base. When the circuit breaker 14 is completely racked into the cell 74, the terminal 66 on the plug wire harness and the terminal 68 on the receptacle wire harness are kept in mechanical contact by the bias to assure reliable electrical contact.

Optionally, a radial floating mount can be used with the receptacle 50 and base 102 similar to that described above with regard to the plug 10 which allows movement of the guide pins 42 within their respective slots 46 and 48. The base 102 can include a base slot 124 which is sized to receive one or more base shoulder screws (not shown) therethrough. The sliding engagement between the heads of the shoulder screws with the surface of the base 102 opposite the perimeter wall 112 provides a radial floating mount of the receptacle 70 to the base 102. The conical, tapered shape of the guide pins mating ends 66 making contact with the perimeter wall 112 can then move the receptacle 70 within the base slot 124.

Figure 5A:
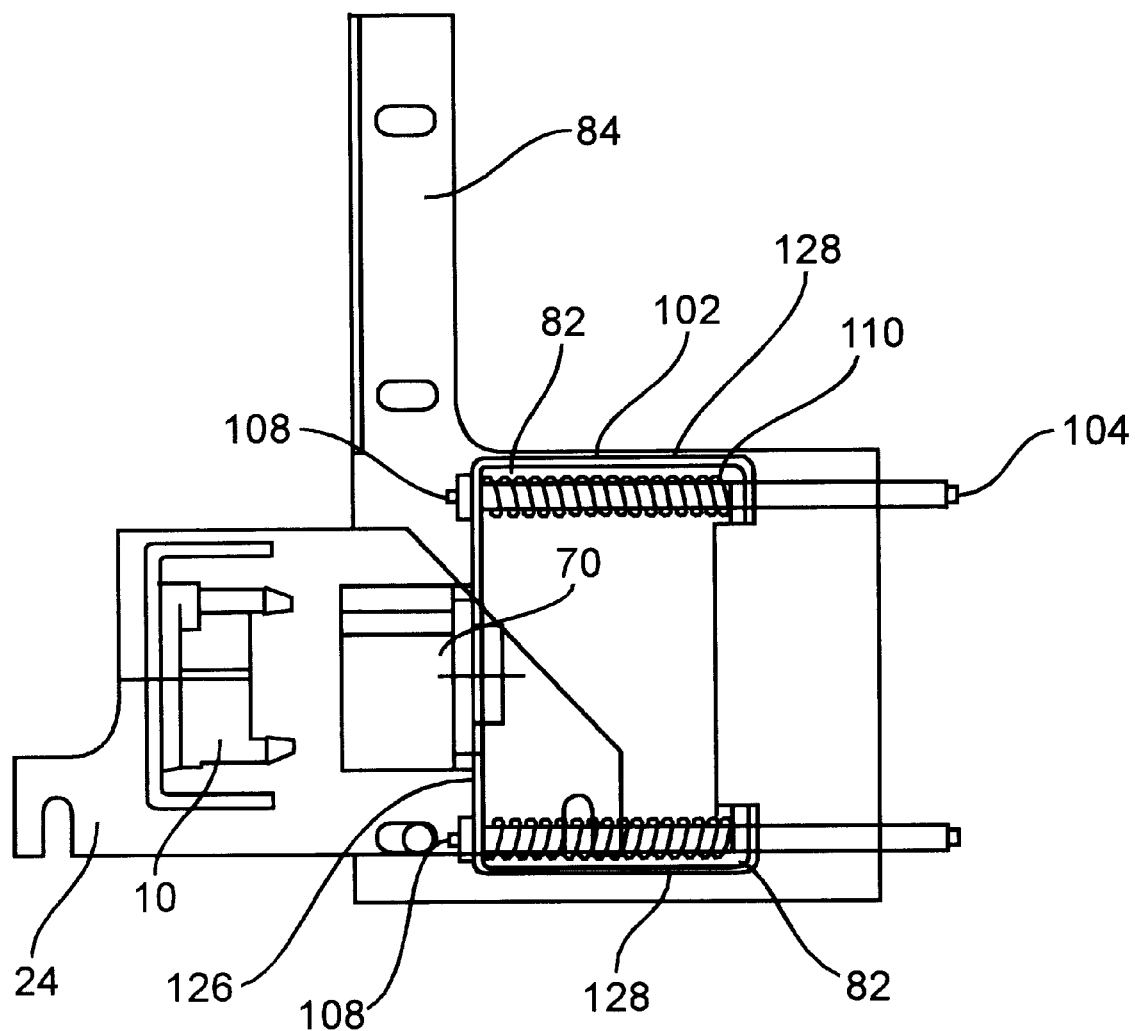
Figs 5A–5C show an isolated side view the plug and receptacle of the inventive secondary connections assembly at the FIG. 5A the remove/disconnect position, FIG. 5B the test position, and FIG. 5C the fully connected position.
Figure 5B:
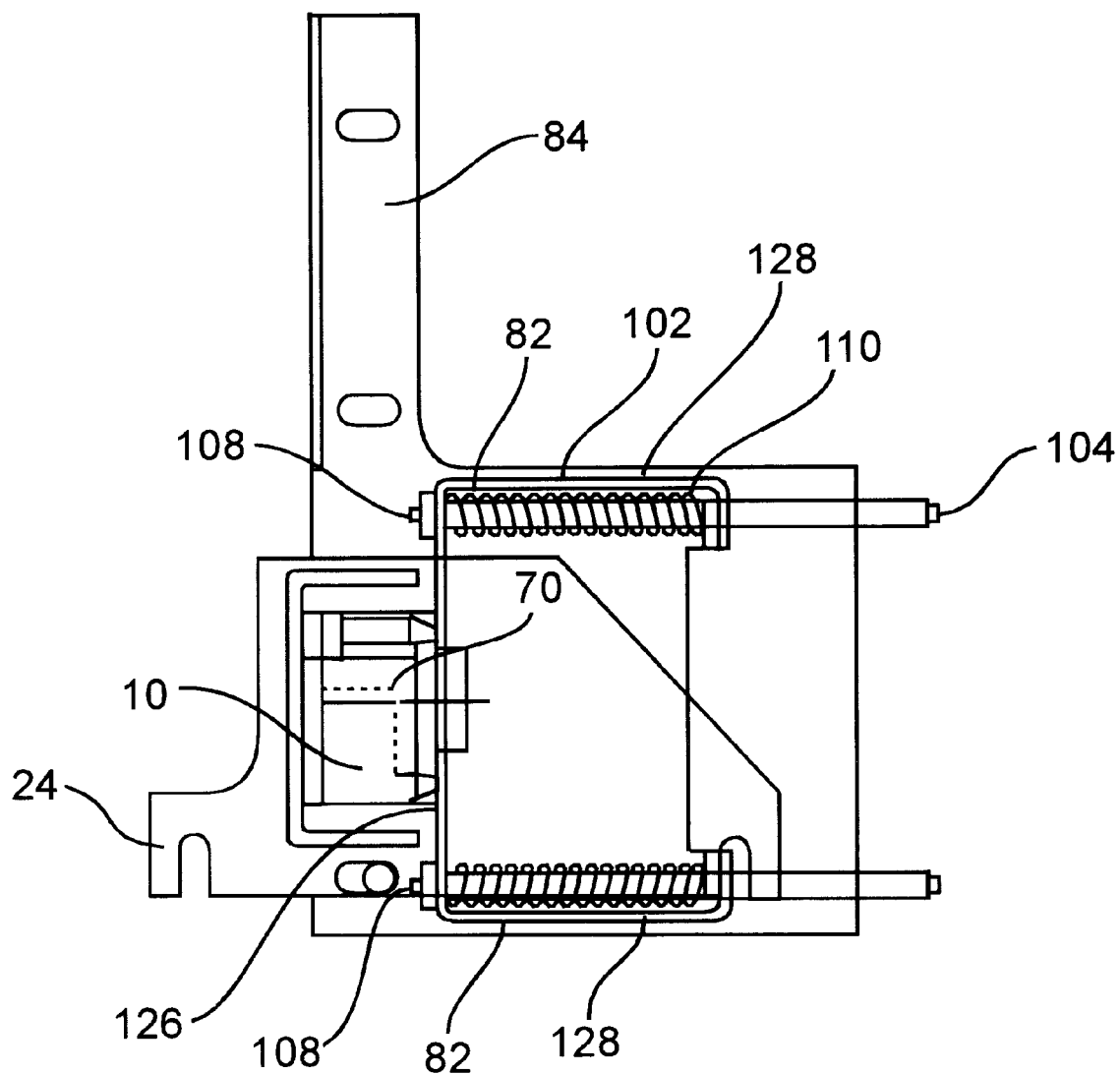
Figure 5C:
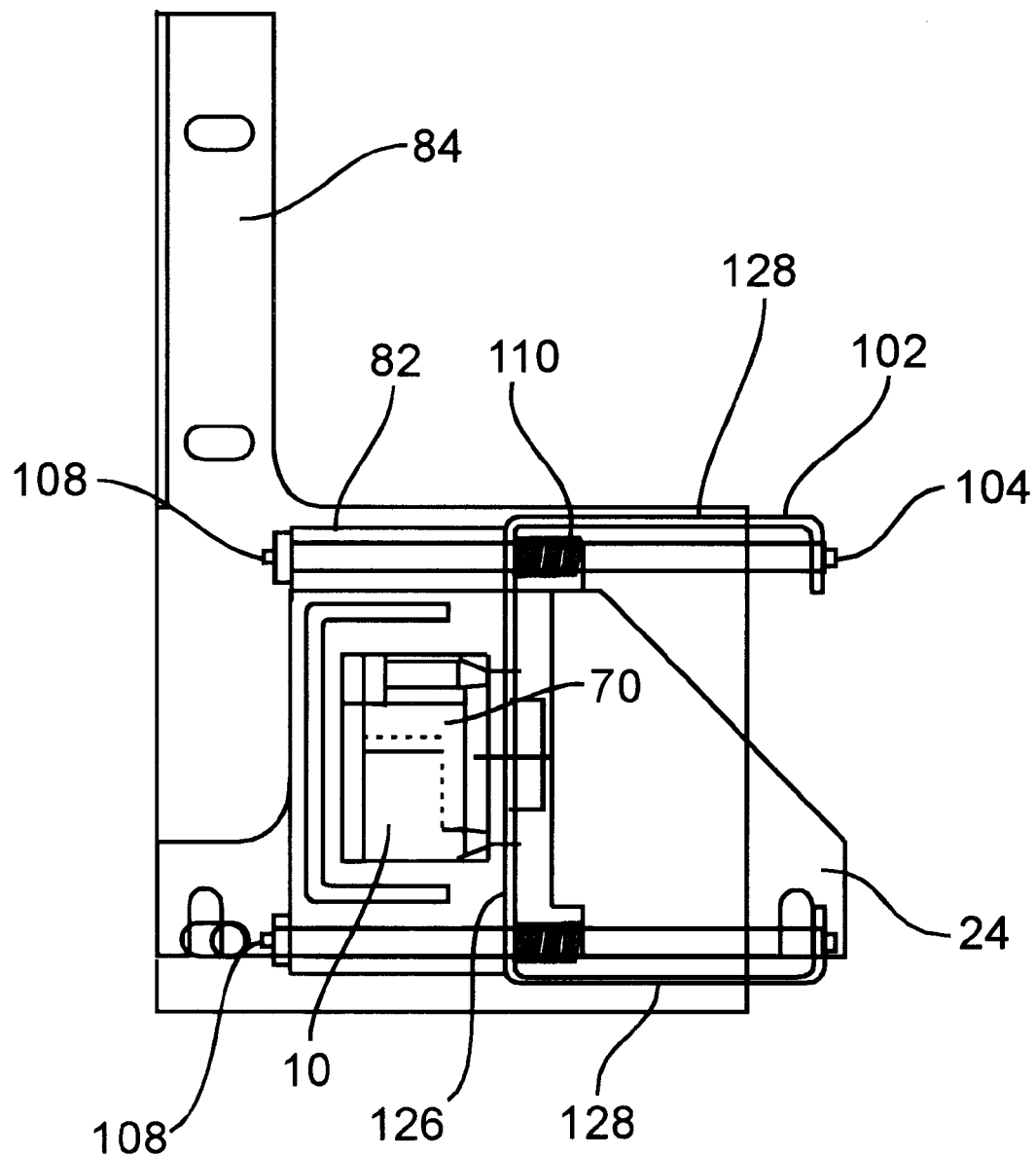

Three different functional positions for the secondary connections assembly 12 are illustrated in FIGS. 5A–C. Specifically, FIG. 5A depicts the plug 10 and the receptacle 70 in the remove/disconnect position wherein the circuit breaker 14 has been partially inserted into the cell 74. In the remove/disconnect position, no electrical connection has been made between the primary connections nor secondary connections of the circuit breaker 14 and the cell 74. In the remove/disconnect position, electrical current can not flow through the secondary connections assembly so no testing can be completed.

FIG. 5B depicts the plug 10 and the receptacle 70 in the test position wherein the circuit breaker 14 has been substantially, but not completely, inserted into the cell 74. In the test position, the primary connections are still not connected, but the secondary connections are completed by the connection of terminal 66 of the plug 10 and terminal 68 of the receptacle 70. Connection between the components of the secondary connections assembly 10 allows troubleshooting and data metering prior to completing the primary connections and energizing the circuit breaker 14.

Since the plug 10 and receptacle 70 are positioned near the front panel 18 of the circuit breaker and the front face 78 of the cell, respectively, the circuit breaker 14 has traveled a substantial distance into the cell 74 before completely automatic engagement between the two components starts. The guide pins 42 provide alignment flexibility to engage and mate with the corresponding receptacle 70. The sliding engagement between the heads of the shoulder screws 50 and 56 with the surface 38 within the connector slots 52 and 58 of the plug provides a radial floating mount of the plug 10 to the bracket 22. The radial floating mount of the plug 10 allows movement of the guide pins 42 within their respective slots 46 and 48 which, in turn, provides alignment flexibility to engage the corresponding receptacle 70. The conical, tapered shape of the mating ends 65 provides a sloped contact surface to first contact a perimeter wall 112 of the receptacle 70. If the initial alignment of the plug 10 and receptacle 70 is off-center, the radial floating mount of the plug 10 to the bracket 22 allows the contact between the perimeter wall 112 and the tapered shape of the mating ends 65 to push the plug 10 and receptacle into proper alignment.

FIG. 5C depicts the plug 10 and the receptacle 70 in the connected position wherein the circuit breaker 14 has been completely inserted into the cell 74. In the connected position, both the primary connections and secondary connections are completed. The electrical circuit is complete with full overcurrent protection and system monitoring in place.

As the circuit breaker 14 is further pushed from the test position to the fully connected position, the translational travel of the plug 10 against the receptacle 70 begins to compress the springs 110 and apply a bias against the surface 100 of the base. As a result, the terminal 66 on the plug wire harness and the terminal 68 on the receptacle wire harness are biased against each other. When the circuit breaker 14 is completely racked into the cell 74 in the fully connected position, the terminal 66 on the plug wire harness 67 and the terminal 68 on the receptacle wire harness 69 are kept in mechanical contact by the bias to assure reliable electrical contact.

The assembly 12 also includes continuity verification ports 114 as specifically illustrated in FIG. 4 which allow the adequacy of the electrical connections to be tested without having to disassemble the circuit breaker 14 from the cell 74. Continuity wires 116 are connected to the continuity verification ports 114 for simple operator access. It is therefore unnecessary for an operator to remove the circuit breaker 14 in order to test the adequacy of the electrical connection. An inner gas shield assembly 118 provides protection against damage of any parts in close proximity to the electrical connection being formed.

The present invention is not only useful as original equipment, but can be readily used to convert field equipment already installed. Prior to installation of the replacement assembly 12, any existing plug assemblies and gas shields are removed. For retrofitting old circuit breakers, the cell mounting plate 84 includes a new gas shield assembly 118. Both are attached to the side wall 76 of the cell in a different location near the front face 78 of the cell. Only the opposite end 120 of the cell wires 94 same location where the old pieces were removed a new wire connections port 122.

It should be noted that most any type of electrical terminal is suitable for use on either the plug 10 or receptacle 70. The plug 10 and receptacle 70 can also switch positions wherein the plug 10 is mounted on the side wall 76 of the interior of the cell and vice versa. Either the plug 10 or receptacle 70 can be stationary while the other is adjustable in its position, or biased against the other, or both. Both the plug 10 and receptacle 70 can be adjustable in their positions, or biased against the other, or both. The positions of the guide pins 42 and perimeter wall 112 can also be switched between the plug 10 and receptacle 70. Other means for adjusting the alignment between the plug 10 and receptacle 70 so that the respective terminals 66 and 68 are reversibly electrical connected are also suitable for use with the present invention.

As those skilled in the art will appreciate, the inventive secondary connections assembly can be adapted and configured for use with a wide variety of circuit breakers and other circuit interrupters. The present invention is suitable for use in low, medium, and high voltage applications and in various phase configurations. The term circuit breaker is defined to include all types of circuit interrupters as well as, but not be limited to, single or polyphase circuit breakers, vacuum or air breakers, fusible switches, and the like. The term switchgear is used herein to denote electrical distribution equipment for providing electrical power to multiple circuit breakers and includes, but is not limited to distribution boards, panelboards, and the like.

While particular embodiments and applications of the present invention have been illustrated and described, it is to be understood that the invention is not limited to the precise construction disclosed herein and that modifications, chances, and variations which will be apparent to those skilled in the art may be made in the arrangement, operation and details of construction of the invention disclosed herein without departing from the spirit and scope of the invention as defined in the appended claims.

What is claimed is:

1. An assembly for automatically mating a plug terminal attached to the exterior of a circuit breaker with a receptacle terminal attached to the interior of a switchgear cell to provide secondary connections between the plug and receptacle terminals, the assembly comprising:
   a plug having a generally planar body partially defined by a surface and opposing surface;
   a plug terminal supported by the opposing surface of the plug;
   a bracket slidably affixed to the opposing surface of the plug, the bracket having an aperture to allow the plug terminal to extend therethrough, the bracket being secured in a fixed position to the exterior of the circuit breaker; and
   means for automatically adjusting the position of the plug to provide proper alignment as the plug terminal engages the receptacle terminal to form an electrical connection between the terminals which can be disengaged, the adjusting means being connected to the plug and bracket, the adjusting means having:
      at least one guide pin, the guide pin having one end secured to the opposing surface of the plug, the other end of the guide pin adapted for mating with the receptacle terminal to form a reversibly affixed connection therewith;
      at least one slot formed in the bracket, the slot has the dimensions sufficient to allow the one guide pin to extend therethrough and slide within the slot;
      at least one connector slot formed in the plug; and
      a shoulder screw having a head on one end with a size larger than the connector slot, the other end of the screw extending through the connector slot and is affixed to the bracket, the head of the screw has a sliding engagement with the surface of the plug along the perimeter of the connector slot so that the plug radially floats within the connector slot relative to the bracket.

2. The assembly of claim 1 wherein the mating end of the guide pin has a conical, tapered shape.

3. The assembly of claim 1 wherein the adjusting means further includes a second guide pin, the second guide pin having one end secured to the opposing surface of the plug, the other end of the guide pin adapted for mating with the receptacle terminal to form a reversibly affixed connection, the mating ends of the guide pins have a conical, tapered shape.

4. The assembly of claim 3 wherein the guide pins are positioned in a diagonal arrangement on opposing corners of the opposing surface of the plug.

5. The assembly of claim 1 wherein the exterior of the circuit breaker is partially defined by a front panel, a rear panel for insertion into the switchgear cell, and side panels therebetween, the bracket is secured to the side panel of the circuit breaker in a position near the front panel of the circuit breaker.

6. The assembly in claim 1 wherein the assembly further includes:
   a receptacle having a generally planar body partially defined by a surface and an opposing surface;
   a receptacle terminal supported by the opposing surface of the receptacle;
   a cell bracket affixed to the opposing surface of the receptacle, the cell bracket having an aperture to allow the receptacle terminal to extend therethrough, the cell bracket being secured in a fixed position to the interior of the switchgear cell.

7. The assembly in claim 1 wherein the adjusting means is further connected to the receptacle and cell bracket.

8. An assembly for automatically mating a plug terminal attached to the exterior of a circuit breaker with a receptacle terminal attached to the interior of a switchgear cell to provide secondary connections between the plug and receptacle terminals, the assembly comprising:
   a receptacle having a generally planar base partially defined by a surface and an opposing surface;
   a receptacle terminal supported by the opposing surface of the receptacle;

a cell bracket slidably affixed to the opposing surface of the receptacle, the cell bracket having an aperture to allow the receptacle terminal to extend therethrough, the cell bracket being secured in a fixed position to the interior of the switchgear cell;

means for automatically adjusting the position of the receptacle to provide proper alignment between the plug terminal and the receptacle terminal to form an electrical connection between the terminals which can be disengaged, the adjusting means being connected to the receptacle and cell bracket, the adjusting means having:

at least one guide pin, the guide pin having one end secured to the opposing surface of the plug, the other end of the guide pin adapted for mating with the receptacle terminal to form a reversibly affixed connection therewith, the mating end of the guide pin has a conical, tapered shape;

at least one base slot formed in the base; and a shoulder screw having a head on one end with a size larger than the base slot, the other end of the screw extending through the base slot and affixed to the bracket, the head of the screw has a sliding engagement with the surface of the base along the perimeter of the base slot so that the receptacle radially floats within the base slot relative to the bracket.

9. The assembly in claim 8 wherein the adjusting means includes a wall upstanding from the opposing surface of the base and extending around the perimeter of the receptacle terminal, the wall shaped to engage the adjusting means connected to the plug terminal.

10. The assembly of claim 8 wherein the receptacle includes means for automatically applying a bias to the receptacle terminal against the plug terminal from a test position wherein the circuit breaker is partially inserted in the interior of the switchgear cell and the plug terminal and receptacle terminal initially engage to form an electrical connection to a fully connected position wherein the circuit breaker is fully inserted into the interior of the switchgear cell.

11. The assembly of claim 10 wherein the bias means includes at least two rods affixed in a stationary position to the interior of the cell, the base has a body with two elongated legs, each rod has one end affixed to the body of the base and the other end extending through a hole in one of the elongated legs, and each rod has a coil spring wrapped around the length of the rod extending between the body of the base and the one elongated leg.

12. A method for automatically making secondary connections between a circuit breaker and a switchgear cell, the circuit breaker having a plug terminal attached to its exterior and the switchgear cell having a receptacle terminal attached to its interior, the secondary connections provided between the plug and receptacle terminals, the plug terminal having at least one guide pin and the receptacle terminal having corresponding surface for affixing to the guide pin thereto, the guide pin having one end secured to the opposing surface of the plugs, the other end of the guide pin adapted for mating with the receptacle terminal to form a reversibly affixed connection therewith, at least one slot formed in the bracket, the slot has the dimensions sufficient to allow the one guide pin to extend therethrough and slide within the slot, at least one connector slot formed in the plug, and a shoulder screw having a head on one end with a size larger than the connector slot, the other end of the screw extending through the connector slot and is affixed to the bracket, the head of the screw has a sliding engagement with the surface of the plug along the perimeter of the connector slot so that the plug radially floats within the connector slot relative to the bracket, the method comprising the steps of:

engaging the guide pin of the plug and corresponding surface of the receptacle terminal;

automatically sliding the position of the plug terminal relative to the receptacle terminal to provide proper alignment to form an electrical connection between the plug and receptacle terminals which can be disengaged; and mating the guide pin of the plug and corresponding surface of the receptacle terminal in a reversibly affixed connection.

13. The method of claim 12 wherein the sliding step includes:

providing a connector slot in the plug;

extending the end opposite the head of a shoulder screw through the connector slot and affixing one end of the shoulder screw to the circuit breaker; and radially floating the shoulder screw within the connector slot with a sliding engagement between the surface of the plug along the perimeter of the connector slot and the head of the shoulder screw.

14. The method of claim 12 wherein the sliding step further includes automatically sliding the position of the receptacle terminal relative to the plug terminal to provide proper alignment to form an electrical connection between the plug and receptacle terminals which can be disengaged.

15. The method of claim 12 wherein the method further includes the step of:

automatically applying a bias to the receptacle terminal against the plug terminal from a test position wherein the circuit breaker is partially inserted in the interior of the switchgear cell and the plug terminal and receptacle terminal initially engage to form an electrical connection to a fully connected position wherein the circuit breaker is fully inserted into the interior of the switchgear cell.

16. The method of claim 15 wherein the biasing step includes:

affixing at least two rods in a stationary position to the interior of the cell;

providing the receptacle with a base having a body with two elongated legs;

affixing one end of each rod to the body of the base and extending the other end extending through a hole in one of the elongated legs; and extending a coil spring along the length of the rod between the body of the base and the elongated leg.

* * * * *